(12) United States Patent
Jung et al.

(10) Patent No.: US 11,878,927 B2
(45) Date of Patent: Jan. 23, 2024

(54) WIDE AREA FORMING DEVICE

(71) Applicant: DAEHO TECHNOLOGY KOREA CO., LTD., Gyeongsangnam-do (KR)

(72) Inventors: Yong Wha Jung, Gyeongsangnam-do (KR); Yeoung Hyung Lee, Gyeongsangnam-do (KR); Dong Yeon Jung, Gyeongsangnam-do (KR)

(73) Assignee: DAEHO TECHNOLOGY KOREA CO., LTD., Gyeongsangnam-Do (KR)

( * ) Notice: Subject to any disclaimer, the term of this patent is extended or adjusted under 35 U.S.C. 154(b) by 232 days.

(21) Appl. No.: 17/106,929

(22) Filed: Nov. 30, 2020

(65) Prior Publication Data
US 2021/0163330 A1    Jun. 3, 2021

(51) Int. Cl.
*C03B 11/08* (2006.01)

(52) U.S. Cl.
CPC .......... *C03B 11/08* (2013.01); *C03B 2215/46* (2013.01)

(58) Field of Classification Search
CPC ..................................................... C03B 25/06
See application file for complete search history.

(56) References Cited

U.S. PATENT DOCUMENTS

2008/0152750 A1* 6/2008 Tanaka .................. B29C 43/021
425/357

FOREIGN PATENT DOCUMENTS

| CN | 209506971 U | * | 10/2019 | |
|---|---|---|---|---|
| JP | 2018095521 A | * | 6/2018 | |
| KR | 1764795 B1 | * | 8/2017 | ......... C03B 23/0086 |

OTHER PUBLICATIONS

KR1764795B1 Epo Machine Translation—Performed Sep. 19, 2022. (Year: 2022).*
JP2018-095521 Epo Machine Translation—Performed Sep. 19, 2022. (Year: 2022).*
CN-209506971-U EPO Machine translation Performed Apr. 11, 2023. (Year: 2023).*

* cited by examiner

*Primary Examiner* — Lisa L Herring
(74) *Attorney, Agent, or Firm* — The PL Law Group, PLLC

(57) ABSTRACT

A wide area forming device according to an embodiment of the present disclosure includes a mold unit in which an object to be formed is received, and a main chamber having an upper block press the mold unit to form the object to be formed, and a lower block supporting the mold unit.

10 Claims, 7 Drawing Sheets

WIDE AREA FORMING DEVICE

CROSS REFERENCE TO RELATED APPLICATION

The present application claims priority to Korean Patent Application No. 10-2019-0155048, filed Nov. 28, 2019, the entire contents of which is incorporated herein for all purposes by this reference.

BACKGROUND OF THE INVENTION

1. Field of the Invention

The present disclosure relates generally to a forming device that is configured for forming a wide area object.

2. Description of the Related Art

Wide area glass having a curved portion is widely used for a front window or a back cover of a mobile or a display device. The glass having the curved portion may be used as a lens of a camera.

An object to be formed may be heated and pressed in a wide area mold unit to form a desired 3-dimensional (3D) shaped glass or a desired 3D shaped lens.

SUMMARY

Accordingly, the present disclosure is intended to propose a wide area forming device using a mold unit with a wide area or a great weight.

In order to achieve the above objective, according to one aspect of the present disclosure, there is provided a wide area forming device. The wide area forming device includes a vertical transfer means configured to raise and lower a mold unit and a horizontal transfer means configured to transfer the mold unit in a horizontal direction, when the mold unit receiving an object to be formed is transferred from a first position to a second position, wherein the vertical transfer means and the horizontal transfer means may be configured to be alternately brought into contact with a lower portion of the mold unit at the first position or the second position.

The wide area forming device of the present disclosure may include a mold unit having an upper mold and a lower mold in which an object to be formed may be received between the upper mold and the lower mold, wherein, while the upper mold is raised from the lower mold and then pivots, a molding surface of the upper mold or the lower mold may be cleaned.

The wide area forming device of the present disclosure may include a mold unit configured to receive an object to be formed; and a main chamber comprising an upper block and a lower block, the upper block being configured to press the mold unit for forming the object to be formed and the lower block configured to support the mold unit, wherein a plurality of upper blocks may face one mold unit.

The transfer unit of the present disclosure can transfer the wide area mold unit between blocks by raising the mold unit. When the mold unit is transferred along a first direction, which is a transfer direction of the mold unit, the mold unit may be fundamentally prevented from contacting/sliding with the lower block.

Accordingly, when each bock or the mold unit may be repeatedly used under a severe condition in the high-temperature main chamber, abrasion or generation of foreign matter can be prevented.

Non-contact transfer of the wide area mold unit may be advantageous for preventing abrasion or generation of foreign matter. Furthermore, the countermeasure may be required to prevent collision or interference between the transfer means at a point where transfer directions vertically cross.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
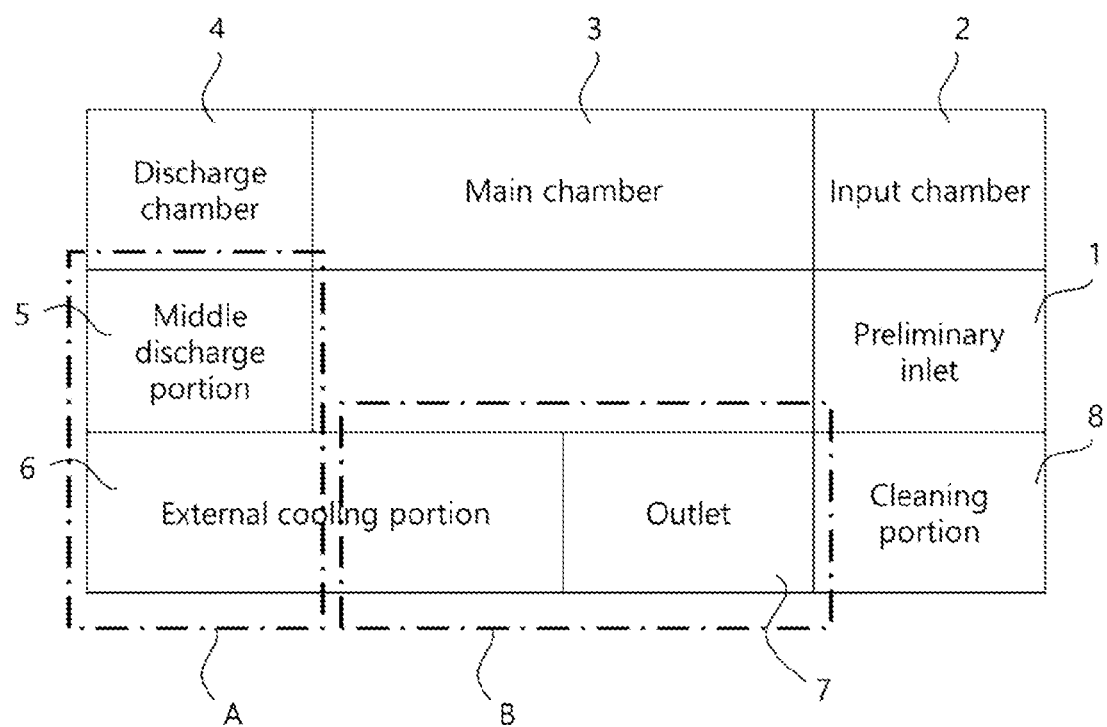
FIG. 1 is a plan view showing a wide area forming device according to the present disclosure.

Hereinbelow, referring to FIGS. 1 to 7, a wide area forming device according to the present disclosure may include a main chamber 3.

In the following description, an object to be formed may include a camera lens, glass having a curved portion, cover glass for a watch, dashboard glass for a vehicle, glass covering various measuring devices, sapphire, a light transmitting plate, a front window and a back cover for a mobile device or a display device. Portion or all of the object to be formed may be formed to have a curved surface and a 3D shape.

Hereinbelow, a first direction may be an x-axis direction, a second direction may be a y-axis direction, and a third direction may be a z-axis direction. A forward transfer direction may be a positive x-axis direction, and a reverse transfer direction may be a negative x-axis direction. A transfer direction of a middle discharge portion 5 or an auxiliary cooling portion may be a positive y-axis direction or a negative y-axis direction. A height direction may be the third direction or the z-axis direction.

The main chamber 3 may include an upper block 310 that is brought into contact with an upper side of a mold unit 200 and a lower block 320 that is brought into contact with a lower side of the mold unit 200. For convenience of transferring the wide area mold unit 200, an input chamber 2 may be installed in an entrance side of the main chamber 3, and a discharge chamber 4 may be installed in a discharge side of the main chamber 3.

The input chamber 2, the main chamber 3, and the discharge chamber 4 may be arranged in a row in the first direction. In order to insert the mold unit 200 into the input chamber 2, a preliminary inlet 1 may be provided perpendicularly to the main chamber 3 with the input chamber 2 as the center. In the preliminary inlet 1, the object to be formed in an initial state may be inserted into the mold unit 200. In the preliminary inlet 1, the object to be formed is inserted between an upper mold 210 and a lower mold 220, and the upper mold 210 and the lower mold 220 may be assembled to each other.

The mold unit 200, in which forming has been completed, may be discharged in the discharge chamber 4. The middle discharge portion 5 may be provided perpendicularly to the main chamber 3 with the discharge chamber 4 as the center. In a reverse direction of a transfer direction of the main chamber 3, an external cooling portion 6 to which the mold unit 200 is transferred may be provided in parallel to the main chamber 3. The middle discharge portion 5 may be a passage that connects the discharge chamber 4 to the external cooling portion 6. A transfer direction from the discharge chamber 4, the middle discharge portion 5, toward the external cooling portion 6 is the second direction, and a transfer direction from the external cooling portion 6 toward an outlet 7 is the negative X-axis direction. The transfer direction may be bent by 90 degrees with the external cooling portion 6 as the center. The vertical transfer means and the horizontal transfer means may be provided at a junction where the middle discharge portion 5 and the external cooling portion 6 cross each other.

The mold unit 200, which has been slowly cooled in the external cooling portion 6, is disassembled in the outlet 7, and the object to be formed may be taken out from the mold unit 200. After the object to be formed is taken out from the outlet 7, the mold unit 200 may be transferred to a cleaning portion 8. The cleaning portion 8 may clean a molding surface of the mold unit 200.

Figure 7:
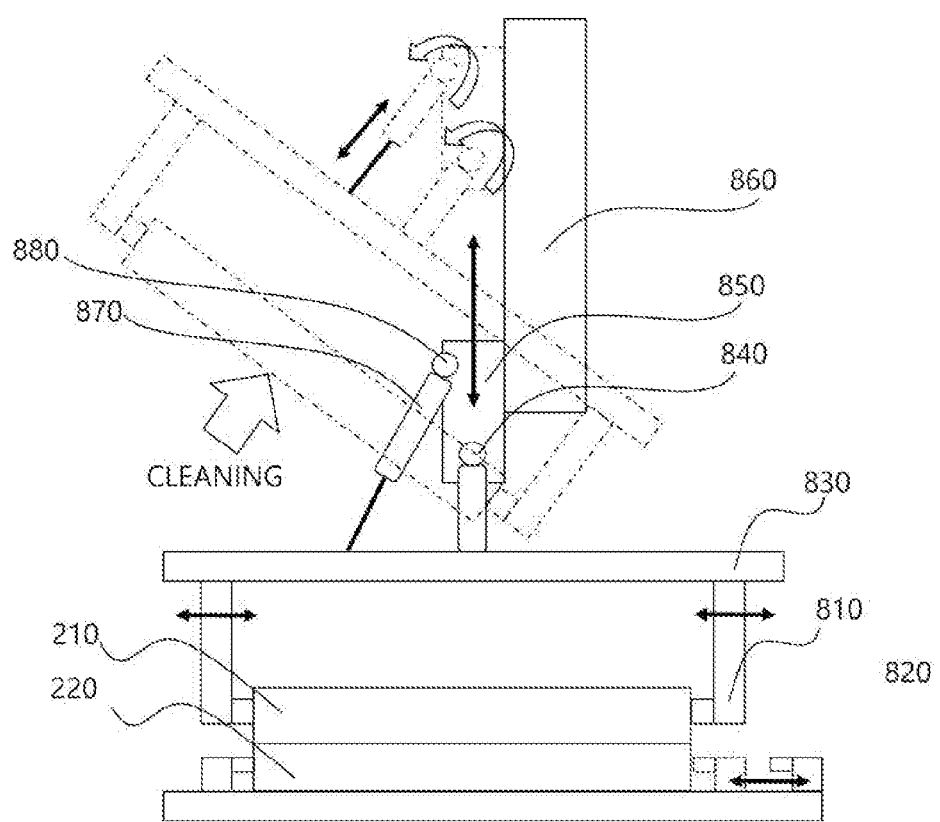
FIG. 7 is a view showing operation of a cleaning portion according to the present disclosure.

FIG. 7 is a view showing configuration of the cleaning portion 8 in detail. The cleaning portion 8 may be configured as follows. A lower mold arm 820 clamps the lower mold 220 and may be movable for the purpose. An upper mold arm 810 may move or pivot centering around a cleaning jig 830, and may clamp the upper mold 210. The upper mold 210 clamped by the cleaning jig 830 may be adjusted to a height and an angle suitable for cleaning while being raised and lowered or pivoting.

A sliding portion 850 may be raised and lowered the upper mold arm 810. The sliding portion 850 may move in a straight line along a support 860. A pivot portion 840 may pivot the upper mold arm 810 or the cleaning jig 830. The upper mold arm 810 or the cleaning jig 830 may pivot around the pivot portion 840.

The sliding portion 850 may be raised from the upper mold arm 810 by which the upper mold 210 is clamped so that the upper mold 210 may be separated from the lower mold 220. When the upper mold 210 is separated from the lower mold 220, the object to be formed may be taken out from the cleaning portion 8.

The upper mold arm 810 may pivot around the pivot portion 840 and the molding surface of the upper mold 210 may be cleaned. Foreign matter may be removed from the molding surface by rubbing the molding surface with a brush.

Linear movement and rotational movement of the cleaning jig 830 may be performed by extension and contraction of a cylinder 870. Accordingly, the pivot portion 840, the cylinder 870, and a cylinder fixed point 880 may be provided. The extendable cylinder 870 may be provided between the sliding portion 850 and the support 860. The pivot portion 840 and the cylinder fixed point 880 may be installed to be spaced apart from each other by a predetermined distance. When the cylinder 870 is extended, the cleaning jig 830 by which the upper mold 210 is clamped may pivot around the pivot portion 840. When the sliding portion 850 moves along the support 860, the cleaning jig 830 by which the upper mold 210 is clamped may be raised and lowered.

Referring FIGS. 1 to 6, the mold unit 200 may include the lower mold 220 facing the lower block 320 and the upper mold 210 facing the upper block 310.

The main chamber 3 may include at least one of a preheating unit provided for heating the mold unit 200 to a preheat temperature, a forming unit provided for heating the mold unit 200 to a forming temperature and pressing the mold unit 200 to form a curved surface of the object to be formed, and a cooling unit provided for cooling the mold unit 200 in which the forming has been completed. The upper block 310 or the lower block 320 may be provided in at least one of the preheating unit, the forming unit, and the cooling unit.

The wide area mold unit 200 has a great weight or a wide area and requires a special transfer means for preventing abrasion or generation of foreign matter during transfer, and the upper block 310 or the lower block 320 also needs a specially designed configuration.

Figure 6:
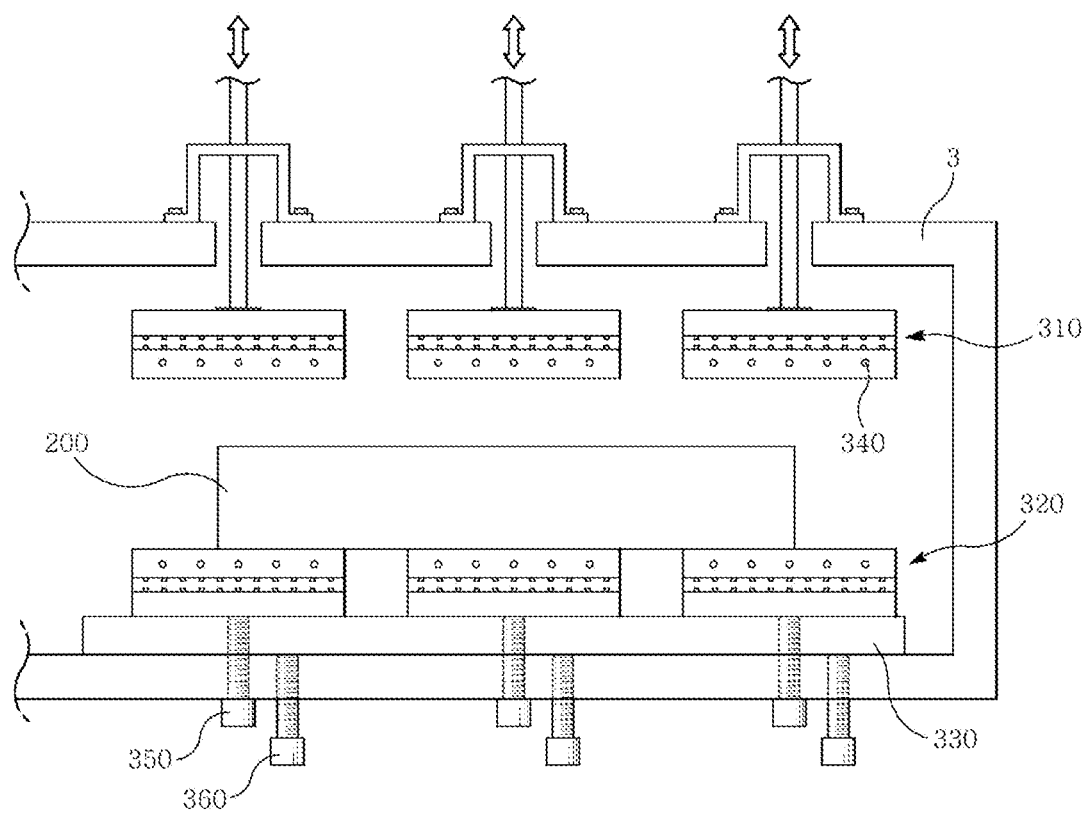
FIG. 6 is a section view showing an upper block and a lower block of a main chamber according to the present disclosure.

Referring to FIGS. 1 and 6, the main chamber 3, the input chamber 2, and the discharge chamber 4 may be arranged in a row along the first direction. The mold unit 200 may be transferred in a straight line along the first direction. The input chamber 2 may be installed at the entrance side of the main chamber 3. The discharge chamber 4 may be installed at the discharge side of the main chamber 3.

In order to preheat, form, and cool the wide area mold unit 200, the upper block 310 and the lower block 320 may advantageously have a structure consisting of a plurality of upper blocks 310 or a plurality of lower blocks 320, rather than a structure consisting of a single upper block 310 or a single lower block 320. Considering the weight and the high temperature state, the structure consisting the plurality of upper blocks or the plurality of lower blocks is good for maintaining flatness due to bending or thermal deformation. Preferably, the plurality of upper blocks 310 and the plurality of lower blocks 320 may face the single mold unit 200. The upper block 310 or the lower block 320 may have a heater 340, and may have a passage for cooling water. The mold unit 200 may be heated or cooled by contact conduction.

In order to adjust flatness of the lower block 320, a means to apply an external force may be required for each of the lower blocks 320. A pull bolt 350 and a push bolt 360 may be positioned between the lower block 320 and a bottom surface of the main chamber 3. The pull bolt 350 or the push bolt 360 may face a common cooling plate 330 to which each of the lower blocks 320 is connected.

The pull bolt 350 may pull the lower block 320 toward the bottom surface. The push bolt 360 may push the lower block 320 from the bottom surface. Bending or flatness of the lower block 320 may be adjusted by fastening the pull bolt 350 or the push bolt 360.

Meanwhile, non-contact transfer of the wide area mold unit 200 may be advantageous to prevent abrasion or attachment of generation of foreign matter. Furthermore, a countermeasure may be required to prevent collision or interference of the transfer means at a point where transfer directions cross each other perpendicularly. The means for preventing collision between the transfer means and for allowing the mold unit 200 to be transfer without sliding, at the point where the transfer directions cross each other, such as the preliminary inlet 1, the input chamber 2, the discharge chamber 4, the middle discharge portion 5, the external cooling portion 6, but excluding the main chamber 3.

When the mold unit 200 in which the object to be formed is received is transferred from a first position to a second position, the present disclosure may separately have the vertical transfer means and the horizontal transfer means.

The vertical transfer means may raise and lower the mold unit 200 in a vertical direction. The horizontal transfer means may transfer the mold unit 200 in a horizontal direction. The vertical direction is the third direction, and the horizontal direction may be the first direction or the second direction.

The vertical transfer means and the horizontal transfer means may be alternately brought into contact with a lower portion of the mold unit 200 at the first position or the second position. For example, at the first position, the vertical transfer means raises the mold unit 200, and the horizontal transfer means may approach the lower portion of the mold unit 200. When the vertical transfer means is lowered, the mold unit 200 is placed on the horizontal transfer means, and when the horizontal transfer means moves, the mold unit 200 may be horizontally transferred from the first position to the second position. The vertical transfer means and the horizontal transfer means may alternately transfer the mold unit 200 without collision at the cross point.

Figure 2:
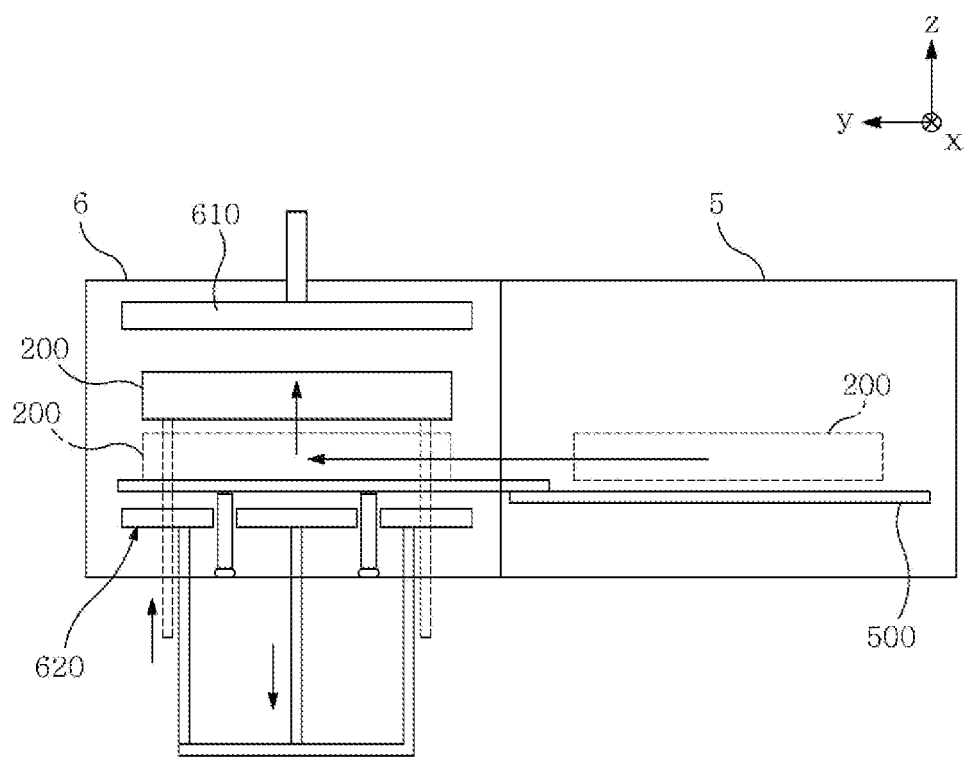
FIGS. 2 to 4 are side view showing a state in which a mold unit is transferred from a middle discharge portion to an external cooling portion according to the present disclosure.

Referring to FIG. 2, the mold unit 200 is placed on a telescopic plate 500 at the middle discharge portion 5. The telescopic plate 500 may extend from the middle discharge portion 5 toward the external cooling portion 6.

An upper cooling plate 610 or a lower cooling plate 620 that are provided in the external cooling portion 6 may be brought into contact with the mold unit 200 and may cool the mold unit 200. The upper cooling plate 610 may be raised and lowered relative to the upper mold 210. The lower cooling plate 620 may have a structure in which the lower cooling plate is divided into a plurality of portions for avoiding collision or interference occurring on a transfer path. The lower cooling plate 620 may include a main cooling plate 621 and an auxiliary cooling plate 622. The main cooling plate 621 may be connected to a main cooling plate shaft 623. The auxiliary cooling plate 622 may be connected to an auxiliary cooling plate shaft 624. The main cooling plate shaft 623 and the auxiliary cooling plate shaft 624 may be connected to each other by a connection shaft 625.

A spring 627 may be inserted between the connection shaft 625 and the auxiliary cooling plate shaft 624. When the connection shaft 625 is raised, the main cooling plate 621 may be brought into contact with a center portion of the mold unit 200. The auxiliary cooling plate shaft 624 elastically biased by the spring 627 when the connection shaft 625 is raised may be brought into contact with an outer portion of the mold unit 200. Accordingly, contact performance is improved and cooling performance may be improved.

The spring 627 may be inserted between the connection shaft 625 and the auxiliary cooling plate shaft 624. A spring fixing bolt 626 may be fastened to the connection shaft 625 or the auxiliary cooling plate shaft 624 so as to fix the spring 627.

The telescopic plate 500 may extend from the middle discharge portion 5 corresponding to the first position toward the external cooling portion 6 corresponding to the second position while being loaded with the mold unit 200. In order to prevent collision between the lower cooling plate 620 of the external cooling portion 6 corresponding to the second position and the telescopic plate 500, the lower cooling plate 620 may be in a lowered state by the connection shaft 625.

In order to return the telescopic plate 500 in the second position to an initial position thereof or to the first position, a means for raising the mold unit 200 loaded on the telescopic plate 500 is required. A raising and lowering pin 640 may be raised and lowered through a hole or a groove formed on the telescopic plate 500. When the raising and lowering pin 640 is raised, the mold unit 200 may be spaced apart from the telescopic plate 500. The telescopic plate 500 may be return to the initial position thereof or the first position.

Figure 3:
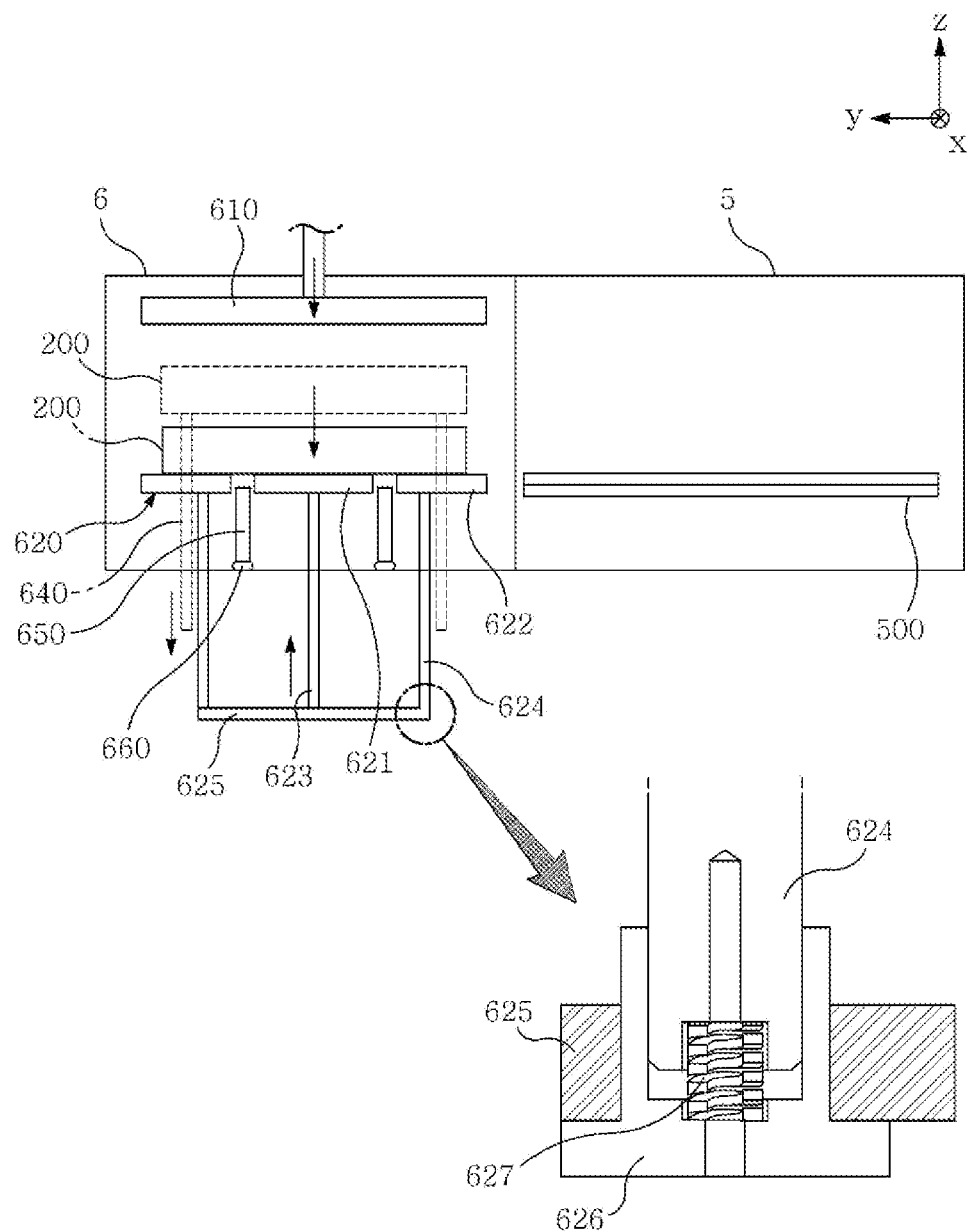

Referring to FIG. 3, after the telescopic plate 500 is returned to the initial position or the first position, the lower cooling plate 620 may be raised to a height at which the lower cooling plate 620 may support the mold unit 200. The raising and lowering pin 640 loaded with the mold unit 200 may place the mold unit 200 on the lower cooling plate 620 while being lowered. While the upper cooling plate 610 is lowered, the upper cooling plate 610 may be in contact with an upper portion of the mold unit 200, thereby improving the cooling performance.

Figure 4:
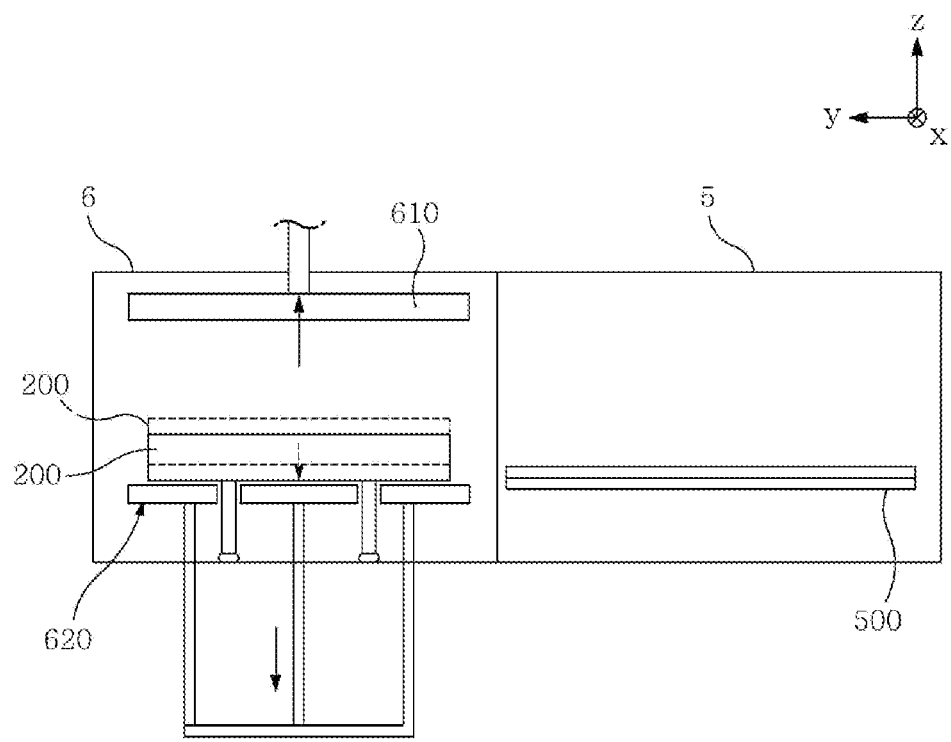

Referring to FIG. 4, the mold unit 200 may be transferred in the negative first direction in the external cooling portion 6. A shuttle block 650 may be installed as the horizontal transfer means. When the upper cooling plate 610 is raised and the lower cooling plate 620 is lowered, the mold unit 200 may be seated on the shuttle block 650. The lower cooling plate 620 may be configured to be divided into the main cooling plate 621 and the auxiliary cooling plate 622, and the shuttle block 650 may be positioned in a gap between the main cooling plate 621 and the auxiliary cooling plate 622. The shuttle block 650 may reciprocate along a linear guide 660 in the first direction. The shuttle block 650 may not need to be raised and lowered. The auxiliary cooling plate 622 may act as to the vertical transfer means and the shuttle block 650 may act as the horizontal transfer means.

Figure 5:
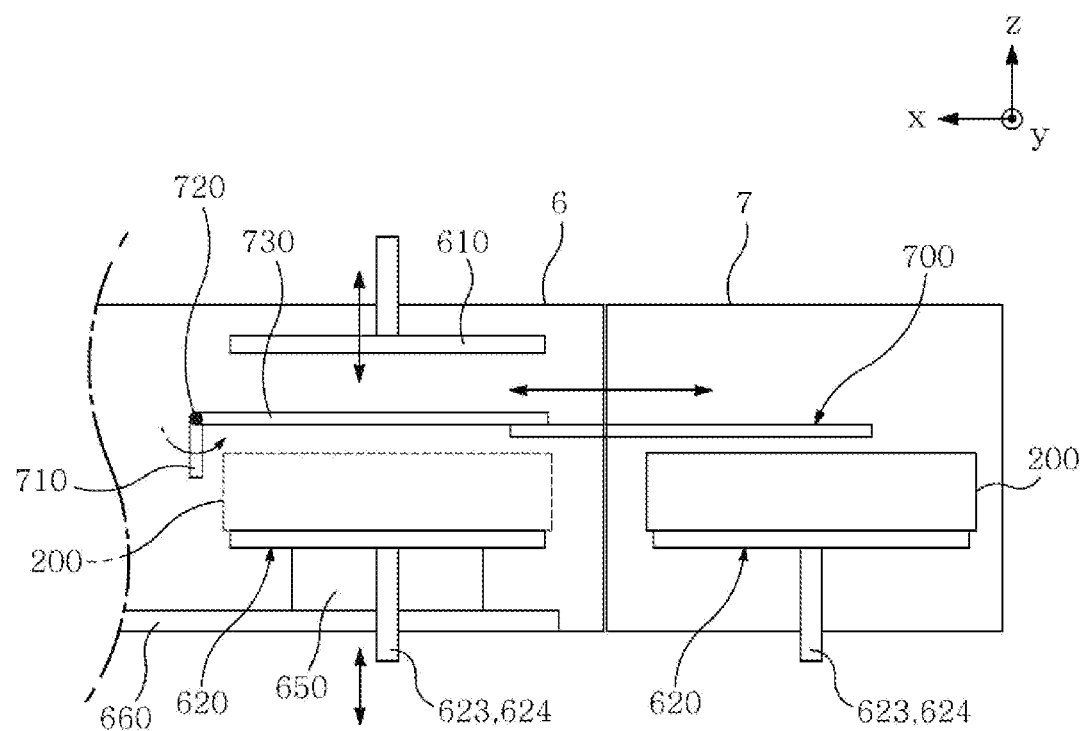
FIG. 5 is a front view showing a state in which the mold unit is transferred from the external cooling portion to an outlet according to the present disclosure.

Referring to FIG. 5, the mold unit 200 may be transferred from the external cooling portion 6 to the outlet 7. A pusher unit 700 that extends and contracts may be installed as the horizontal transfer means. The pusher unit 700 may include a pusher extension part 730 extending and contracting along the transfer direction and a pusher 710 pivoting around an end of the pusher unit 700. The pusher 710 may pivot around a pusher pivot portion 840, 720.

The pusher extension part 730 may extend and approach to one side of the mold unit 200 with the pusher 710 in a folded state. While the pusher 710 is unfolded and the pusher extension part 730 contracts, the pusher 710 pulls the one side of the mold unit 200, so that the mold unit 200 may be transferred to the lower cooling plate 620 in the outlet 7.

As described above, the vertical transfer means and the horizontal transfer means are configured to prevent collision between the vertical transfer means and the horizontal transfer means and to minimize sliding contact of the mold unit 200.

What is claimed is:

1. A wide area forming device comprising:
   a vertical transfer means configured to raise and lower a mold unit and a horizontal transfer means configured to transfer the mold unit in a horizontal direction, when the mold unit receiving an object to be formed is transferred from a first position to a second position; and
   a raising and lowering pin passing through a hole or a groove provided in a telescopic plate on which the mold unit is placed, wherein the raising and lowering pin is configured to raise and lower the mold unit, wherein the vertical transfer means and the horizontal transfer means are configured to be alternately brought into contact with a lower portion of the mold unit at the first position or the second position, and wherein, while the mold unit is loaded on the telescopic plate, the telescopic plate extends from a middle discharge portion corresponding to the first position toward an external cooling portion corresponding to the second position.

2. The wide area forming device of claim 1, wherein a length of the telescopic plate is configured to extend and contract while the mold unit is placed thereon.

3. The wide area forming device of claim 1, further comprising:
   a pusher extension part configured to extend and contract along a transfer direction of the mold unit;
   a pusher configured to pivot around the pusher extension part; and
   a pusher pivot portion rotatably connecting the pusher to the pusher extension part,
   wherein, while the pusher is folded, the pusher extension part extends, and
   the pusher extension part approaches to one side of the mold unit when the pusher extension part extends.

4. The wide area forming device of claim 1, further comprising:
   a pusher configured to extend and contract in a transfer direction of the mold unit, and a pusher configured to pivot around a pusher extension part,
   wherein, while the pusher is unfolded and the pusher extension part contracts, the pusher pulls one side of the mold unit when the mold unit is transferred.

5. A wide area forming device comprising:
   a mold unit having an upper mold and a lower mold in which an object to be formed is received between the upper mold and the lower mold, wherein, while the upper mold is raised from the lower mold and then pivots, a molding surface of the upper mold or the lower mold is cleaned;
   a lower mold arm configured to clamp the lower mold;
   an upper mold arm configured to clamp the upper mold;
   a sliding portion configured to raise and lower the upper mold arm; and
   a pivot portion configured to pivot the upper mold arm,
   wherein the sliding portion raises the upper mold arm clamping the upper mold to separate the upper mold from the lower mold, and
   the upper mold arm pivots around the pivot portion and the molding surface of the upper mold or of the lower mold is cleaned.

6. The wide area forming device of claim 5, wherein the upper mold arm is movably mounted on a cleaning jig,
   the pivot portion is positioned at a rotational center point of the cleaning jig,
   the pivot portion is provided in the sliding portion,
   the sliding portion is raised and lowered relative to a support, and
   a cylinder is provided between the sliding portion and the cleaning jig and configured to extend and contract therebetween.

7. A wide area forming device comprising:
   a mold unit configured to receive an object to be formed; and
   a main chamber having:
      a plurality of upper blocks configured to press the mold unit for forming the object to be formed and facing the mold unit;
      a plurality of lower blocks configured to support the mold unit; and
      a plurality of pull bolts and a plurality of push bolts positioned between the plurality of lower blocks and a bottom surface of the main chamber, the plurality of pull bolts configured to pull the plurality of lower blocks in a direction toward the bottom surface of the main chamber, the plurality of push bolts configured to push the plurality of lower blocks from the bottom surface of the main chamber, wherein bending or flatness of the plurality of lower blocks are adjusted by fastening at least one of the plurality of pull bolts and the plurality of push bolts.

8. The wide area forming device of claim 7, further comprising:
   a preliminary inlet that is located at a position in which the object to be formed is inserted into the mold unit,
   wherein the main chamber extends in a first direction,
   the preliminary inlet extends in a second direction,
   the first direction and the second direction are perpendicular to each other, and
   the mold unit having an upper mold and a lower mold in which the object to be formed is inserted between the upper mold and the lower mold from the preliminary inlet, and the upper mold and the lower mold are assembled with each other.

9. The wide area forming device of claim 7, further comprising at least one of:
   an input chamber provided at an inlet side of the main chamber;
   a discharge chamber provided at a discharge side of the main chamber;
   an external cooling portion configured to cool the mold unit;
   a middle discharge portion connecting the discharge chamber to the external cooling portion;
   an outlet that is located at a position through which the object to be formed, which has been formed, is taken out from the mold unit;
   a cleaning portion configured to clean the mold unit; and
   a preliminary inlet that is located at a position through which the object in an initial state is inserted into the mold unit,
   wherein the input chamber, the main chamber, and the discharge chamber are arranged in order in a first direction,
   the preliminary inlet or the middle discharge portion is arranged in a second direction that is perpendicular to the first direction, and
   the external cooling portion is provided in parallel to the main chamber.

10. The wide area forming device of claim 7, further comprising: a vertical transfer means and a horizontal transfer means provided at a point where a direction in which the mold unit is transferred is bent from a straight line inside or outside the main chamber,
   wherein the vertical transfer means is configured to raise and lower the mold unit and the horizontal transfer means is configured to transfer the mold unit in a horizontal direction.

* * * * *